（12）United States Patent
Yamashita et al.

(10) Patent No.: US 12,253,217 B2
(45) Date of Patent: Mar. 18, 2025

(54) CASING FOR GAS, AND TANK VALVE DEVICE

(71) Applicant: KAWASAKI JUKOGYO KABUSHIKI KAISHA, Kobe (JP)

(72) Inventors: Hiroshi Yamashita, Kobe (JP); Hiromitsu Kiyose, Kobe (JP); Yutaka Suzuki, Kobe (JP); Makoto Ninomiya, Kobe (JP); Masayoshi Okamoto, Kobe (JP); Ryo Miyoshi, Kobe (JP); Tomohei Kobayashi, Kobe (JP); Daiki Miyamoto, Kobe (JP); Daichi Kano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/011,721

(22) PCT Filed: Jun. 15, 2021

(86) PCT No.: PCT/JP2021/022727
§ 371 (c)(1),
(2) Date: Dec. 21, 2022

(87) PCT Pub. No.: WO2021/261333
PCT Pub. Date: Dec. 30, 2021

(65) Prior Publication Data
US 2023/0313948 A1  Oct. 5, 2023

(30) Foreign Application Priority Data
Jun. 25, 2020 (JP) ................................ 2020-109876

(51) Int. Cl.
*F17C 13/04* (2006.01)
*F16K 27/02* (2006.01)
(Continued)

(52) U.S. Cl.
CPC ............ *F17C 13/04* (2013.01); *F16K 27/029* (2013.01); *F16L 41/16* (2013.01); *F16K 27/00* (2013.01);
(Continued)

(58) Field of Classification Search
CPC .............. F17C 13/04; F17C 2205/0326; F17C 2205/0329; F17C 2205/0382;
(Continued)

(56) References Cited

U.S. PATENT DOCUMENTS 3,872,888 A * 3/1975 Porter ...................... F16L 41/02
251/145
4,573,611 A * 3/1986 O'Connor .................. F16K 1/36
251/111
(Continued)

FOREIGN PATENT DOCUMENTS

CA 2874308 A1 12/2013
DE 4105788 A1 8/1992
(Continued)

OTHER PUBLICATIONS

ISA Japan Patent Office, Written Opinion Issued in Application No. PCT/JP2021/022727, Aug. 10, 2021, WIPO, 8 pages.
(Continued)

Primary Examiner — Minh Q Le
(74) Attorney, Agent, or Firm — Alleman Hall & Tuttle LLP

(57) ABSTRACT

A casing for gas including a first channel section through which gas flows and a second channel section intersecting with the first channel section, the first channel section having an intersecting part that intersects with the second channel section, the intersecting part being formed to have a rounded
(Continued)

quadrangular cross section and having a flat part, the second channel section intersecting with the first channel section to open at the flat part.

8 Claims, 4 Drawing Sheets

(51) Int. Cl.
*F16L 41/16* (2006.01)
*F16K 27/00* (2006.01)
*F16L 25/14* (2006.01)
*F16L 41/02* (2006.01)

(52) U.S. Cl.
CPC ............... *F16K 27/02* (2013.01); *F16L 25/14* (2013.01); *F16L 41/025* (2013.01); *F17C 2205/0326* (2013.01); *F17C 2205/0329* (2013.01); *F17C 2205/0382* (2013.01); *F17C 2205/0394* (2013.01); *F17C 2221/012* (2013.01); *F17C 2221/033* (2013.01); *F17C 2223/0123* (2013.01); *F17C 2223/035* (2013.01); *F17C 2223/036* (2013.01)

(58) Field of Classification Search
CPC ........ F17C 2205/0394; F17C 2221/012; F17C 2221/033; F17C 2223/0123; F17C 2223/035; F17C 2223/036; F16K 27/029; F16K 27/02; F16K 27/00; F16L 41/16; F16L 41/004; F16L 41/025; F16L 41/08; F16L 25/14; Y02E 60/32
USPC ................... 137/505.41; D23/233, 266, 235
See application file for complete search history.

(56) References Cited

U.S. PATENT DOCUMENTS

| | | | | |
|---|---|---|---|---|
| 4,782,861 A | * | 11/1988 | Ross | F17C 13/04 137/505.38 |
| 4,813,575 A | * | 3/1989 | O'Connor | F17C 13/04 222/3 |
| 5,011,114 A | * | 4/1991 | Depuydt | F16L 41/08 285/136.1 |
| 5,036,876 A | * | 8/1991 | Jernberg | F17C 7/00 137/454.6 |
| 5,295,502 A | * | 3/1994 | Lane | F17C 13/04 137/315.04 |
| 5,516,077 A | * | 5/1996 | Roberts | F16K 27/0209 D6/310 |
| 5,671,775 A | * | 9/1997 | Miller | F16K 41/12 137/557 |
| 5,738,145 A | * | 4/1998 | Daicho | F16K 1/306 222/3 |
| 7,322,558 B2 | * | 1/2008 | Cong | H01F 17/0006 251/284 |
| 8,408,243 B2 | | 4/2013 | Suzuki et al. | |
| 2004/0060605 A1 | * | 4/2004 | Jhurani | F17C 13/04 137/614.2 |
| 2006/0151996 A1 | * | 7/2006 | Lang | F24C 3/126 285/197 |
| 2007/0261786 A1 | | 11/2007 | Wang et al. | |
| 2008/0105310 A1 | | 5/2008 | Ogami et al. | |
| 2009/0050635 A1 | * | 2/2009 | Richards | F17C 1/14 220/584 |
| 2013/0175462 A1 | * | 7/2013 | Suzuki | F16K 39/024 251/30.01 |
| 2014/0048169 A1 | * | 2/2014 | Pisot | F16K 1/307 141/4 |
| 2016/0033051 A1 | * | 2/2016 | Barbato | F16K 27/02 137/498 |

FOREIGN PATENT DOCUMENTS

| | | |
|---|---|---|
| JP | S6141517 Y2 | 11/1986 |
| JP | H05287792 A | 11/1993 |
| JP | 5040826 B2 | 10/2012 |
| JP | 201910920 A | 1/2019 |
| KR | 20070099687 A | 10/2007 |
| KR | 101912704 B1 | 10/2018 |

OTHER PUBLICATIONS

ISA Japan Patent Office, International Search Report Issued in Application No. PCT/JP2021/022727 Aug. 10, 2021, WIPO, 6 pages.

* cited by examiner

CASING FOR GAS, AND TANK VALVE DEVICE

TECHNICAL FIELD

The present invention relates to a casing for gas through which gas flows, and a tank valve device.

BACKGROUND ART

A casing has an intersecting part. The intersecting part is a part where two channel sections in which gas flows intersect with each other. In the intersecting part, stress concentrates in an opening part (namely, edge part) where the other channel section opens in one channel section. That is, as the inner faces of the two channel sections are extended outwardly by gas, the stress concentrates in the opening part due to the synergetic effect of tensile stresses acting on the channel sections. As a countermeasure against the stress concentration, for example, the body of PTL 1 is known. In the body of PTL 1, the flow channel is formed while it is tilted with respect to the normal of the cylindrical space when viewed in the axial direction of the cylindrical space. In this way, the stress concentration in the opening part is suppressed.

CITATION LIST

Patent Literature

PTL 1: Japanese Patent Publication No. 5040826

SUMMARY OF INVENTION

Technical Problem

In the body of PTL 1, since the flow channel is formed while it is tilted with respect to the normal of the cylindrical space, the gas flows in along the inner face of the flow channel. Furthermore, the flow channel has a circular cross section. Therefore, a swirl flow is generated in the flow channel. This swirl flow makes the pressure loss in the flow channel large. Therefore, it is preferred to suppress the stress concentration in the intersecting part with a form different from the body of PTL 1.

In light of the above, it is an object of the present invention to provide a casing for gas and a tank valve device capable of suppressing stress concentration in an intersecting part between two channel sections.

Solution to Problem

A casing for gas of the present invention includes a first channel section through which gas flows; and a second channel section intersecting with the first channel section, the first channel section has an intersecting part that intersects with the second channel section, the intersecting part is formed to have a rounded quadrangular cross section, and includes a flat part, and the second channel section intersects with the first channel section so that it opens at the flat part.

According to the present invention, when the intersecting part expands, the flat part having a rounded quadrangular cross section deforms in a bending manner. In other words, since deformation occurs in such a manner that the inner circumference of the flat part is compressed, it is possible to suppress the stress concentration exerted on the part where the second channel section opens.

A tank valve device of the present invention includes a valve block disposed in an opening of a tank that stores gas and having a flow channel that delivers the gas, and a shutoff valve disposed in the valve block and capable of switching connection and disconnection between the flow channel and inside the tank, the flow channel has a first channel section and a second channel section that intersect with each other, the first channel section has an intersecting part intersecting with the second channel section, the intersecting part has a flat part, and the second channel section intersects with the first channel section so that it opens at the flat part.

According to the present invention, when the intersecting part expands, the flat part deforms in a bending manner. That is, since deformation occurs in such a manner that the inner face of the flat part is compressed, it is possible to suppress the stress concentration exerted on the part where the second channel section opens.

Advantageous Effects of Invention

According to the present invention, it is possible to suppress the stress concentration in the intersecting part between the two channel sections.

The above objects, other objects, features, and merits of the present invention will be apparent from the detailed description of the following preferred embodiments by reference to attached drawings.

DESCRIPTION OF EMBODIMENTS

Hereinafter, a casing for gas 1 of an embodiment according to the present invention, and a tank valve device 100 to which the casing 1 is applied are described by referring to the aforementioned drawings. The concept of the direction used in the following description is merely used for convenience in illustration, and should not be understood to limit the orientation or the like of the configuration of the invention to the described direction. The casing 1 and the tank valve device 100 described below each are merely one embodiment of the present invention. Therefore, the present invention is not limited to the following embodiments, but addition, deletion, and modification can be made without departing from the scope of the invention.

Casing

Figure 1:
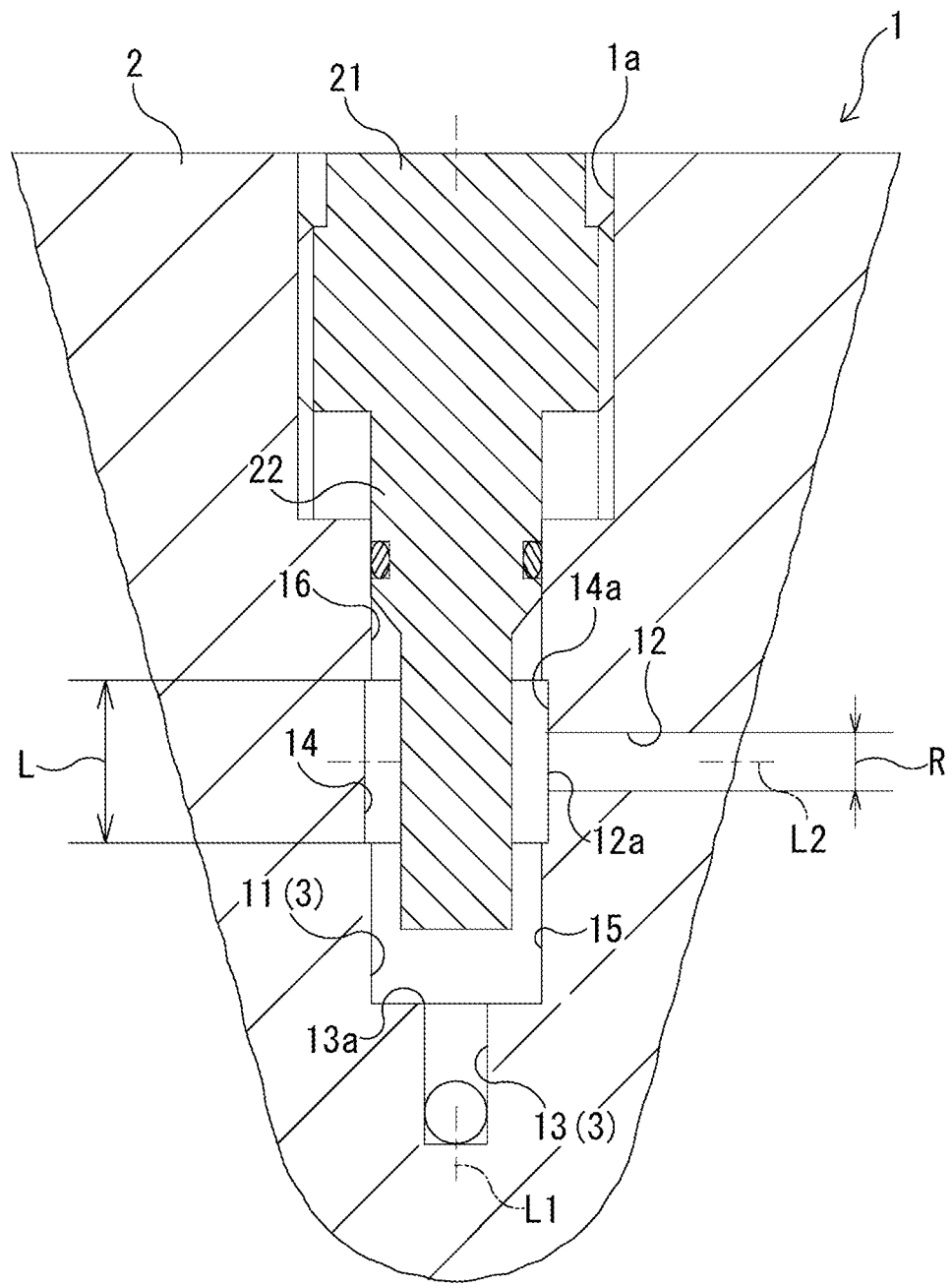
FIG. 1 is a sectional view showing a part of a casing of the present invention.

The casing for gas 1 shown in FIG. 1 (hereinafter, simply referred to as "casing") is applied, for example, in a valve block 111 of the later-described tank valve device 100, and a casing of equipment for gas and the like. The casing 1 includes a casing body 2 and a flow channel 3. The casing body 2 is made of metal (for example, aluminum or stainless and the like). In the present embodiment, the casing body 2 is made of aluminum (that is, made of aluminum or aluminum alloy).

The flow channel 3 is formed in the casing body 2. In the flow channel 3, gas such as hydrogen or natural gas flows. The flow channel 3 has a first channel section 11, a second channel section 12, and a third channel section 13. The first channel section 11 extends in the direction along a predetermined first axial line L11 (which is an axial direction, and one example of a predetermined direction).

Figure 2:
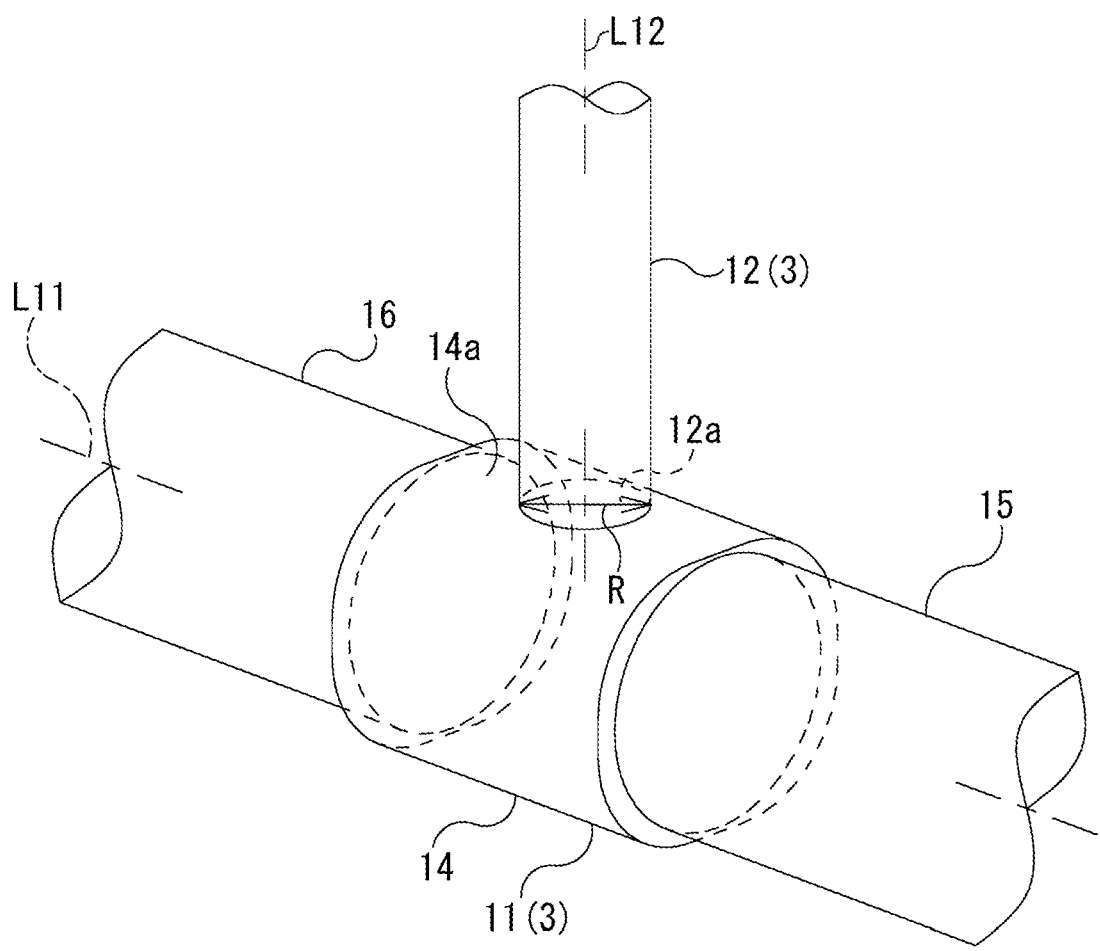
FIG. 2 is a perspective view selectively showing a flow channel provided in the casing of FIG. 1.
Figure 3:
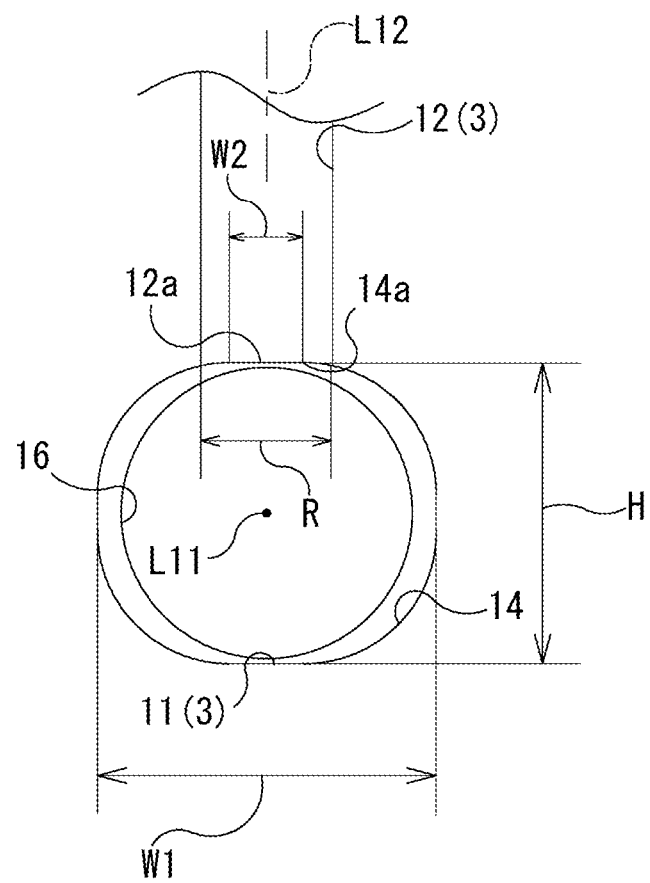
FIG. 3 is a cutout sectional view of the flow channel of FIG. 2.

As shown in FIG. 2, the first channel section 11 has an intersecting part 14. The intersecting part 14 is formed to have a rounded quadrangular sectional shape as shown in FIG. 3. That is, the cross section of the intersecting part 14 cut on the imaginary plane that is perpendicular to the axial direction of the first channel section 11 has a rounded quadrangular shape. The rounded quadrangle is a quadrangle whose corners are R-chamfered. In the present embodiment, the rounded quadrangle is formed to have four linear sides. Not all of the four sides of the rounded quadrangle are necessarily required to be linear. For example, two opposing sides may be formed flat, and the remaining two sides may be formed into an arc shape or a semicircular shape as with an oval track. That is, it is only required that the rounded quadrangle has two linearly formed opposing sides and R-chamfered corners.

The intersecting part 14 is located in the middle part in the axial direction of the first channel section 11. That is, the first channel section 11 has a one-side part 15 and an other-side part 16 that extend on one-side and on the other-side of the axial direction from the intersecting part 14. The one-side part 15 and the other-side part 16 are formed to have a circular sectional shape, and respective flow channel sections are smaller than the channel cross section of the intersecting part 14. That is, width W1 of the cross section of the intersecting part 14 is larger than diameters of the one-side part 15 and the other-side part 16. Therefore, in the first channel section 11, the intersecting part 14 is formed to be wider than the parts on the upstream side and on the downstream side thereof. Also, in the present embodiment, height H of the cross section of the intersecting part 14 is also larger than diameters of the one-side part 15 and the other-side part 16. It is not necessarily required that the channel cross sections of the one-side part 15 and the other-side part 16 are circular.

In the intersecting part 14, at least opposing two sides are linearly formed in the cross section. These two sides have a planar expanse also in the axial direction. Therefore, in the intersecting part 14, two flat parts are formed, and to a flat part 14a of the two flat parts, the second channel section 12 is connected in an intersecting manner. To be more specific, the second channel section 12 intersects with the first channel section 11 such that it opens at the flat part 14a. In other words, the second channel section 12 has an opening part 12a, and the opening part 12a is formed in the flat part 14a.

To be more specific, the second channel section 12 is formed to have a circular cross section. The second channel section 12 extends such that a second axial line L12 is in a skewed position or intersects with respect to the first axial line L11 of the first channel section 11. In the present embodiment, the second channel section 12 extends such that the second axial line L12 intersects with the first axial line L11 of the first channel section 11 at right angles. Since the second channel section 12 extends orthogonally from the intersecting part 14, the second channel section 12 and the intersecting part 14 intersect at right angles, namely, it is possible to prevent an edge part where the second channel section 12 and the intersecting part 14 intersect from having an acute angle. Therefore, it is possible to further suppress the stress concentration exerted on the opening part 12a. It is not necessarily required that the second axial line L12 of the second channel section 12 is orthogonal to the first axial line L11 of the first channel section 11, but may be tilted. The opening part 12a is formed approximately in the center of the flat part 14a. The position where the opening part 12a is formed is not limited to the aforementioned position. That is, the position where the opening part 12a is formed may be shifted from the center in the left and right direction or in the front and rear direction in the flat part 14a.

Also, a pore diameter (more specifically, bore of the opening part 12a) R of the second channel section 12 is formed to be smaller than length L of the axial direction of the flat part 14a. Also, width W2 of the flat part 14a is, for example, more than or equal to 0.5 times and less than or equal to 0.6 times the bore R of the opening part 12a. Thus, in the flow channel 3, the second channel section 12 intersects with the first channel section 11 so that it extends in the direction orthogonal to the first axial line L11 (namely, orthogonal direction).

Also, in the first channel section 11, a part of a valve body is inserted. In the present embodiment, a distal-end-side part of a valve body 22 of a manual valve 21 is inserted. More specifically, a valve insertion hole 1a is formed in the casing 1. In the valve insertion hole 1a, the valve body 22 of the manual valve 21 is inserted. The manual valve 21 is fixed (screwed) to a one-end-side part of the valve insertion hole 1a. The valve body 22 inserted in this manner extends to an other-end-side part of the valve insertion hole 1a. Then, the other-end-side part of the valve insertion hole 1a forms the first channel section 11. Therefore, the distal-end-side part of the valve body 22 of the manual valve 21 is located in the first channel section 11. And, the first channel section 11 is connected to the third channel section 13 on the side opposite to the one-end-side part of the valve insertion hole 1a.

That is, the first channel section 11 is connected to the one-end-side part of the valve insertion hole 1a on one side of the axial direction (for example, the other-side part 16 side), and connected to the third channel section 13 on the other side of the axial direction (for example, the one-side part 15 side). The third channel section 13 extends along the first axial line L11 from the first channel section 11. In the present embodiment, the third channel section 13 extends, and then bends approximately perpendicularly and extends backward of the paper face of FIG. 1.

In the flow channel 3 thus formed, a valve seat part 11a is formed around the part where the third channel section 13 opens to the first channel section 11. Then, the valve body 22 of the manual valve 21 can be seated on the valve seat part 11a. By seating, the clearance between the third channel section 13 and the first channel section 11 is closed.

In the flow channel 3 configured as described above, each section of the flow channel 3 undergoes diameter extension or width extension by the gas pressure as the gas passes through the section. In the case where the intersecting two channel sections each have a circular cross section as in conventional flow channels, both of the channel sections undergo diameter extension. Therefore, a resultant force of two tensile stresses acts and the stress concentrates around the opening part. In contrast, when the intersecting part 14 undergoes width extension, four sides bend to be outwardly convex in the cross section of the intersecting part 14. That is, the flat part 14a bends to be outwardly convex. As a result, the inner circumference of the flat part 14a is compressed. That is, compressive stress can be made to act around the opening part 12a of the flat part 14a. Therefore, in the flat part 14a of the intersecting part 14, both the tensile stress acting by diameter extension of the opening part 12a, and the aforementioned compressive stress act around the opening part 12a. Accordingly, the tensile stress and the compressive stress are cancelled out each other, so that concentration of stress around the opening part 12a can be suppressed. Furthermore, since the cross section of the intersecting part 14 is formed into a rounded quadrangle, it is possible to make the flat part 14a of the intersecting part 14 easy to bend. This makes the tensile stress and the compressive stress cancel out each more effectively. Therefore, it is possible to further suppress the stress concentration around the opening part 12a.

Also, by controlling the width W2 to less than or equal to 0.6 times the bore R, it is possible to achieve both suppression of the stress concentration and thinning in the casing 1. Therefore, by making the width W2 and the length L more than or equal to 0.5 times and less than or equal to 0.6 times the bore R, it is possible to effectively suppress the stress concentration around the opening part 12a while controlling the width W1 of the cross section of the intersecting part 14. Further, by controlling the length L to more than or equal to 1.4 times and less than or equal to 1.5 times the bore R, it is possible to suppress the stress concentration.

Also in the first channel section 11, the intersecting part 14 is formed to be wider than the one-side part 15 and the other-side part 16. Therefore, it is possible to increase the flow passage area of the intersecting part 14. As a result, it is possible to reduce the pressure loss in the intersecting part 14. In particular, while the distal end-side part of the valve body 22 is inserted in the intersecting part 14 in the present embodiment, the flow passage area around the valve body 22 in the intersecting part 14 can be secured by making the width of the intersecting part 14 large as described above. This makes it possible to secure the outer diameter of the valve body 22, resulting that thinning of the valve body 22 can be suppressed. This makes it possible to secure the strength of the valve body 22. In particular, since the valve body 22 of the manual valve 21 is fixed at any opening position during use, it is possible to keep the positional relationship between the valve body 22 and the intersecting part 14. This makes it possible to secure a predetermined flow passage area around the valve body 22.

Also, in the intersecting part 14, the opening part 12a is formed to face the valve body 22. Accordingly, the gas delivered from the second channel section 12 to the intersecting part 14 can be brought into contact with the valve body 22. That is, as the gas comes into contact with the valve body 22, the gas flows separately into one side and the other side in the circumferential direction of the valve body 22 around the valve body 22. This makes it possible to prevent generation of a swirl flow around the valve body 22, and prevent generation of pressure loss by the swirl flow.

The casing body 2 is made of aluminum so as to let hydrogen gas flow through the flow channel 3. Therefore, when hydrogen gas at a high pressure, for example, at a pressure of higher than 1 MPa flows, it is sometimes undesired that stress concentrates around the opening part 12a. Since the casing 1 is capable of suppressing concentration of stress around the opening part 12a, it is especially advantageous to apply the casing 1 to an aluminum casing through which hydrogen gas at a high pressure flows. This description, however, does not limit the application to an aluminum casing.

Tank Valve Device

Figure 4:
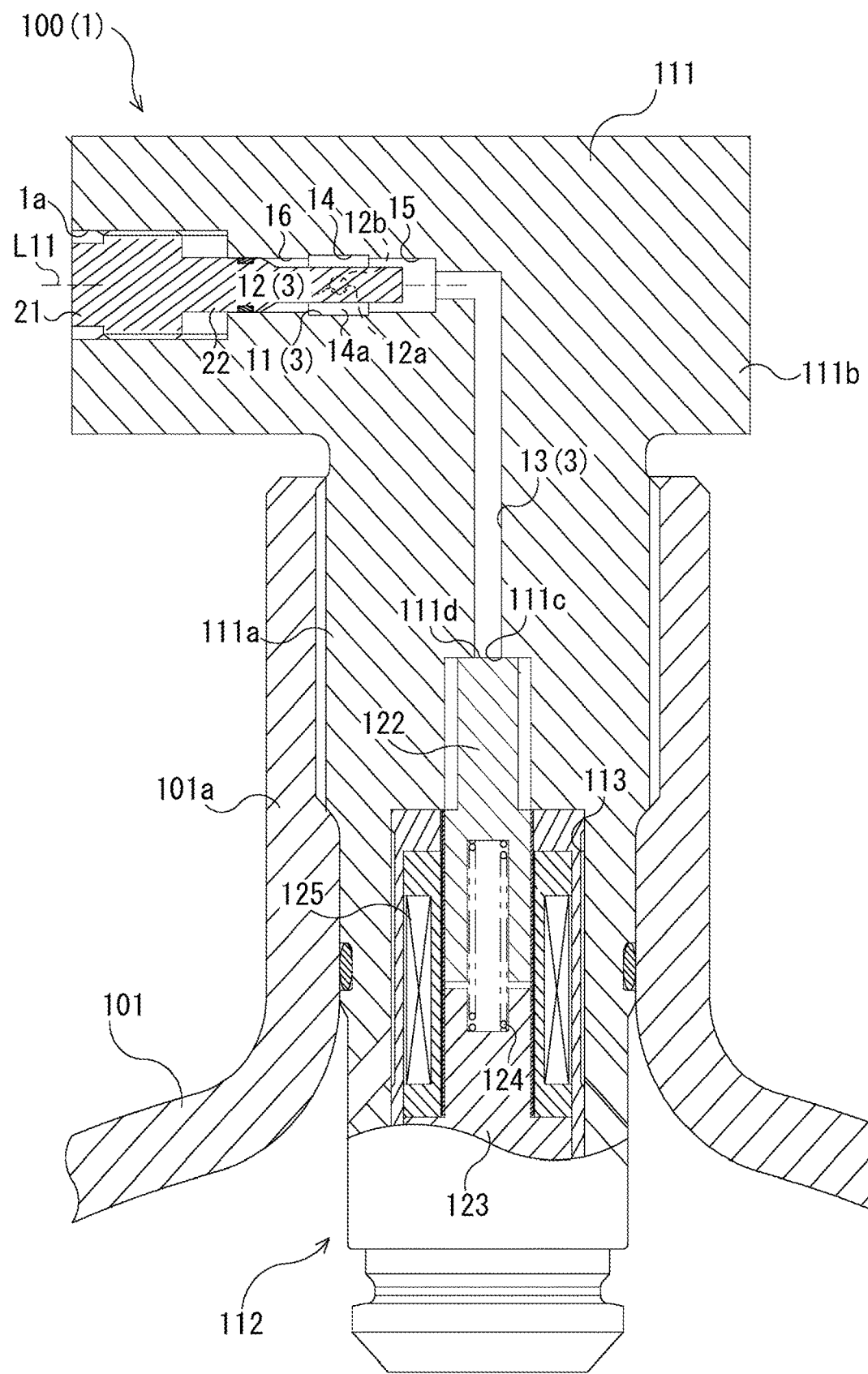
FIG. 4 is a sectional view showing a tank valve device to which the present invention is applied.

Hereinafter, description is made for the tank valve device 100 that is an embodiment to which the aforementioned casing 1 is applied, as shown in FIG. 4. The tank valve device 100 is provided for a gas tank 101 that stores gas such as hydrogen, natural gas and the like. To be more specific, the tank valve device 100 includes the valve block 111, an electromagnetic proportional control valve 112, and the manual valve 21. And, the structure of the aforementioned casing 1 is applied to the valve block 111. Hereinafter, configuration of the valve block 111 is described, and the constituent in the valve block 111 that is the same as the constituent of the casing 1 is denoted by the same reference numeral as the constituent of the casing 1, and description thereof is omitted.

The valve block 111 is attached inside an opening 101a of the gas tank 101. As a result, the opening 101a of the gas tank 101 is sealed. Also, the valve block 111 is provided with respective valve bodies 122, 22 of the electromagnetic proportional control valve 112 and the manual valve 21. The valve block 111 constitutes the electromagnetic proportional control valve 112 and the manual valve 21 together with the valve bodies 122, 22. The tank valve device 100 adjusts the delivery amount of the gas stored in the gas tank 101 by the electromagnetic proportional control valve 112 and the manual valve 21. It is to be noted that the valve block 111 may be provided with valve bodies of various valves, for example, a safety valve and a relief valve, besides the electromagnetic proportional control valve 112 and the manual valve 21.

To be more specific, in the valve block 111, the first to third channel sections 11 to 13, and a valve chamber 113 are formed. More specifically, the second channel section 12 has an inlet/outlet 12b (not shown) on one end. The second channel section 12 is connected to fuel consuming equipment and a filling port (both not shown) via the inlet/outlet 12b. The fuel consuming equipment is, for example, a fuel cell or a gas engine. The inlet/outlet 12b is formed on the outer surface of the valve block 111. In the present embodiment, the inlet/outlet 12b is formed on the lateral surface of the valve block 111. Also, the second channel section 12 extends linearly from the inlet/outlet 12b. Then, the second channel section 12 connects to the intersecting part 14 of the first channel section 11 via the manual valve 21 as shown in FIG. 4. In the first channel section 11, the valve body 22 of the manual valve 21 is inserted to penetrate the intersecting part 14. Furthermore, to the one-side part 15 of the first channel section 11, the third channel section 13 is connected. The third channel section 13 is formed to bend in an L shape from the one-side part 15. The bent part of the third channel section 13 extends along the axial line L1 of the opening 101a of the gas tank 101. The third channel section 13 is connected to the valve chamber 113 via a valve port 111d.

In the valve block 111 configured as described above, the gas in the gas tank 101 first enters the valve chamber 113. Then, the gas flows from the third channel section 13 to the second channel section 12 through the first channel section 11, and is then delivered outside the valve block 111 via the inlet/outlet 12b. On the other hand, in filling the gas tank 101 with gas, the gas is introduced from the inlet/outlet 12b, and the gas flows in the direction reverse to the aforementioned direction. For allowing output and input of gas with respect to the gas tank 101, the valve block 111 is provided with the electromagnetic proportional control valve 112.

The valve block 111 has an insertion part 111a that is provided (screwed, in the present embodiment) in the opening 101a of the gas tank 101. The electromagnetic proportional control valve 112 is attached to the insertion part 111a. That is, in the present embodiment, the tank valve device 100 is an in-tank type tank valve device. It is not necessarily required that the tank valve device 100 is an in-tank valve device. That is, the tank valve device 100 may be of an on-tank type in which the electromagnetic proportional control valve 112 is attached to a projecting part 111b projecting from the opening 101a of the gas tank 101 in the valve block 111. Hereinafter, the configuration of the electromagnetic proportional control valve 112 attached to the insertion part 111a is briefly described. It is to be noted that the structure of the electromagnetic proportional control valve 112 shown below is merely one example, and is not restrictive.

That is, the electromagnetic proportional control valve 112 which is one example of a shutoff valve is configured to open/close the valve port 111d connecting to the third channel section 13 and to be able to adjust the degree of opening of the valve port 111d. The electromagnetic proportional control valve 112 includes the valve body 122, a stationary magnetic pole 123, a biasing member 124, and a solenoid 125. These are accommodated in the valve chamber 113 to configure the electromagnetic proportional control valve 112. To be more specific, the valve chamber 113 connects to the third channel section 13. In the valve chamber 113, a valve seat 111c is formed around the valve port 111d. In the valve chamber 113, the valve body 122 is slidably inserted, and as the valve body 122 is seated on the valve seat 111c, the valve port 111d is closed. On the other hand, as the valve body 122 leaves the valve seat 111c, the valve port 111d is opened. That is, it is possible to deliver gas outside the gas tank 101 from the gas tank 101.

Also, in the electromagnetic proportional control valve 112, the valve body 122 is pushed against the valve seat 111c by the biasing member 124 (for example, compression coil spring). And, by applying a current in the solenoid 125, the valve body 122 is magnetized and attracted to the stationary magnetic pole 123. As a result, the valve body 122 leaves the valve seat 111c to open the valve port 11d. Accordingly, gas in the gas tank 101 is delivered from the third channel section 13 outside the gas tank 101 through the first and second channel sections 11, 12. On the other hand, when the current is stopped, the valve body 122 is seated on the valve seat 111c to close the third channel section 13. This suspends the delivery of the gas. Furthermore, by guiding the gas from the second channel section 12 to the first and third channel sections 11, 13, the valve body 122 is lifted from the valve seat 111c by the gas. As a result, the tank 101 is filled with the gas.

That is, in the tank valve device 100, release and filling of the gas from/into the gas tank 101 can be repeatedly conducted by opening and closing the electromagnetic proportional control valve 112. Therefore, pressure fluctuation of the gas flowing through the flow channel 3 is large, and a stress repeatedly acts around the opening part 12a located downstream the electromagnetic proportional control valve 112. In the case where the stress concentrates around the opening part 12a, it is necessary to design the opening part 12a to have enhanced strength. In this regard, in the valve block 111, concentration of stress around the opening part 12a can be suppressed as described above. Therefore, the degree of freedom in design of the tank valve device 100 can be secured. In particular, in the case of hydrogen gas, the pressure of the gas delivered from the gas tank 101 via the electromagnetic proportional control valve 112 is high, and the stress acting around the opening part 12a tends to be larger. Therefore, by applying the valve block 111 as described above to the tank valve device 100, it is possible to reduce the stress acting around the opening part 12a, and further improve the degree of freedom in design. Therefore, it is especially preferred to apply the valve block 111 to the tank valve device 100.

Other Embodiments

In the present embodiment, the first channel section 11 has such a shape that the cross section of the intersecting part 14 is formed into a rounded quadrangle, however, the shape is not limited to such a shape. That is, the first channel section 11 may have any shape as long as the part where the first channel section 11 is connected with the second channel section 12 is flat, namely, the first channel section 11 has the aforementioned flat part 14a. It is preferred that the cross section of the intersecting part 14 is larger than the channel cross section of the second channel section 12.

In the first channel section 11, the intersecting part 14 is formed to be wider than the one-side part 15 and the other-side part 16, however, the intersecting part 14 need not necessarily be wider. Furthermore, the first channel section 11 may be entirely formed to have a rounded quadrangular cross section as with the intersecting part 14. Furthermore, the flat part 14a need not necessarily be perfectly flat. That is, the flat part 14a may have recesses and projections such as grooves and protrusions as long as compressive stress is generated in the flat part 14a at the time of width extension of the intersecting part 14.

Furthermore, in the casing 1 and the tank valve device 100 of the present embodiment, the valve body to be inserted into the first channel section 11 may be a valve body of other valves such as an electromagnetic proportional control valve, a relief valve and a safety valve. While the valve body 22 is inserted into the first channel section 11, it is not necessarily required that the valve body 22 is inserted into the first channel section 11. Also, the shape of the flow channel 3 is not limited to the shape as described above. For example, in the present embodiment, the second channel section 12 is linearly formed, but it may be formed into an L-shape or an S-shape. That is, it is only required that the second channel section 12 has the opening part 12a that opens at least to the intersecting part 14. The cross sectional shape of the second channel section 12 is not limited to a circle, but may be a rounded quadrangle or an oval. Furthermore, the number of channel sections that intersect with the first channel section 11 is not limited to one, and may be two or more. Also, the second channel section 12 may intersect with the first channel section 11 in a cross shape or in an L shape.

Various modifications and other embodiments of the present invention will be apparent to those skilled in the art from the above description. Accordingly, the above description should be interpreted merely as illustration, and is provided for the purpose of indicating the best mode for carrying out the present invention to those skilled in the art. The details of the structure and/or the function can be substantially changed without departing from the spirit of the present invention.

REFERENCE CHARACTERS LIST 1 casing for gas
2 casing body
11 first channel section
12 second channel section
12b inlet/outlet
14 intersecting part
14a flat part
15 one-side part
16 other-side part
22 valve body
100 tank valve device 101 gas tank
111 valve block
112 electromagnetic proportional control valve

The invention claimed is:

1. A casing for gas, comprising:
a first channel section extending in a predetermined direction and through which gas flows;
a second channel section intersecting with the first channel section; and
a casing body in which the first channel section and the second channel section are formed, wherein
the first channel section has an intersecting part that intersects with the second channel section and has a circular channel cross section on one side and an other side in the predetermined direction from the intersecting part of the first channel section,
the intersecting part is formed to have a rounded quadrangular channel cross section, and includes a flat part, and
the second channel section intersects with the first channel section to open at the flat part.

2. The casing for gas according to claim 1, wherein
the first channel section extends in the predetermined direction, and
the intersecting part is formed to be wider than one side and the other side from the intersecting part in the predetermined direction of the first channel section.

3. The casing for gas according to claim 1, wherein the flat part is formed so that width of the flat part is more than or equal to 0.5 times and less than or equal to 0.6 times diameter of the second channel section.

4. The casing for gas according to claim 1, wherein
hydrogen gas passes through the first channel section and the second channel section, and
the casing body is made of aluminum.

5. The casing for gas according to claim 1, wherein the second channel section extends in an orthogonal direction from the flat part of the intersecting part.

6. A tank valve device, comprising:
a valve block disposed in an opening of a tank that stores gas and having a flow channel that delivers the gas, and
a shutoff valve disposed in the valve block and capable of switching connection and disconnection between the flow channel and inside the tank, wherein
the flow channel has a first channel section and a second channel section that intersect with each other and are formed in the valve block,
the first channel section has an intersecting part intersecting with the second channel section,
the intersecting part has a flat part in a channel cross section, and
the second channel section intersects with the first channel section to open at the flat part.

7. The tank valve device according to claim 6, wherein
the second channel section has an inlet/outlet capable of inputting and outputting the gas, and
the intersecting part is disposed closer to the inlet/outlet than the shutoff valve.

8. A casing for gas, comprising:
a first channel section through which gas flows; and
a second channel section intersecting with the first channel section, wherein
the first channel section has an intersecting part that intersects with the second channel section,
the intersecting part is formed to have a rounded quadrangular channel cross section, including a flat part,
the second channel section intersects with the first channel section to open at the flat part,
in the intersecting part, at least a part of a valve body is inserted, and
the second channel section is open facing with the valve body.

* * * * *